Dec. 21, 1965 D. M. BAUMANN ETAL 3,224,344

MECHANICAL QUANTIZER

Filed Aug. 6, 1963 2 Sheets-Sheet 1

INVENTORS
DWIGHT M. BAUMANN
DAVID E. HANSON
BY RAYMOND SHAMIE

*Blair & Buckles*
ATTORNEYS

INVENTORS
DWIGHT M. BAUMANN
DAVID E. HANSON
BY RAYMOND SHAMIE
Blair & Buckles
ATTORNEYS United States Patent Office 3,224,344
Patented Dec. 21, 1965

3,224,344
MECHANICAL QUANTIZER

Dwight M. Baumann, Cambridge, David E. Hanson, Brockton, and Raymond Shamie, Norwood, Mass., assignors to Metal Bellows Corporation, Sharon, Mass.

Filed Aug. 6, 1963, Ser. No. 300,367
7 Claims. (Cl. 92—45)

Figures 1A, 1B:
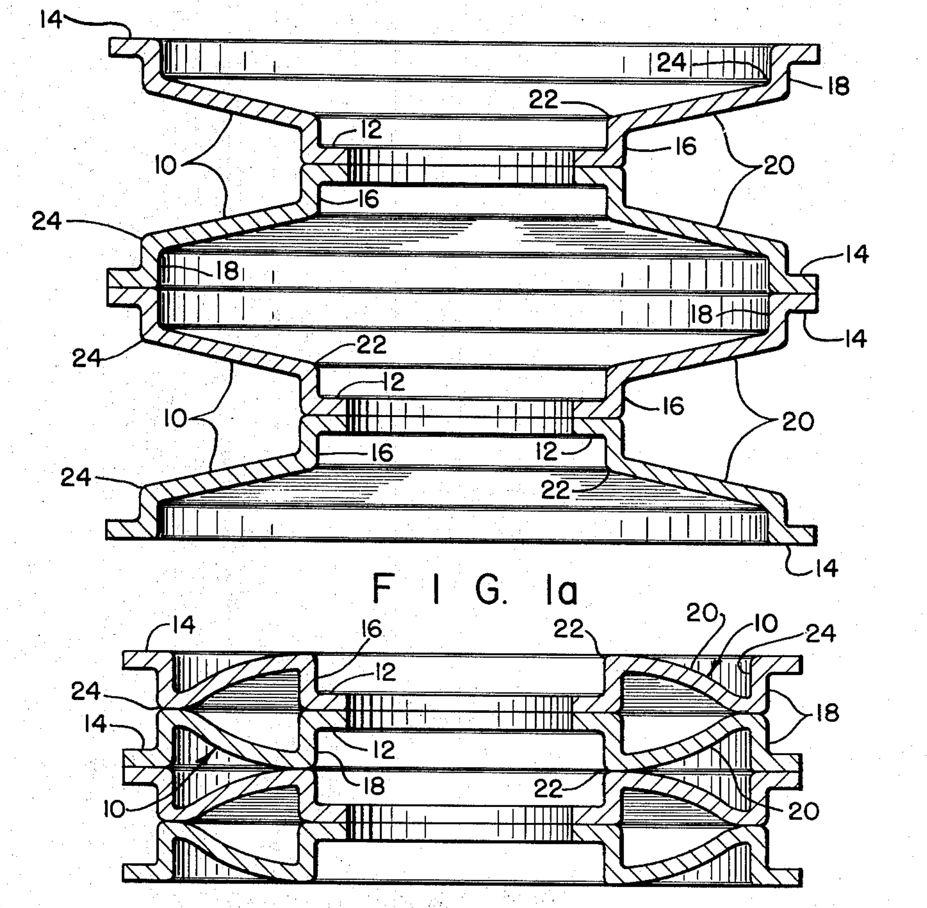

The present invention relates to the metallic bellows art. More particularly it relates to a bellows having at least two stable states of distention. In other words, the bellows is adapted to assume different lengths under the influence of external forces and to remain at such lengths upon the removal of the forces.

Bellows constructed in accordance with my invention find particular application in mechanical digital data processing and computing systems. In all such systems, the bistable unit constitutes one of the basic components. It is essentially a memory device which manifests by its present condition the manner in which it was most previously actuated.

In electronic systems, the bistable unit generally comprises a trigger circuit having two input terminals and two corresponding output terminals. A momentary electrical input at one input terminal results in a continuing electrical output at the corresponding output terminal. This output continues until an input is supplied to the other input terminal, whereupon an electrical output is developed at the corresponding output terminal and the previous electrical output at the other output terminal is terminated. Accordingly, the signals at the output terminals serve as a present reminder of which input terminal last received an input.

In its most basic mechanical form, a bistable device can be analogized to a simple toggle switch where the condition of the switch provides an indication of the manner in which it was last actuated. Stated another way, the switch, by its present condition, indicates how it was last actuated.

Previous electromechanical bistable devices include certain types of relays which can be electrically excited in two different ways to produce two corresponding switch conditions. In order to achieve bistability the relay must remain in a particular position after termination of the electrical excitation. This can be accomplished by well-know expedients such as an arrangement of permanent magnets or holding circuits.

In addition, bistable units of the mechanical and electromechanical varieties have application as quantizing units in digital-to-analog conversion systems. In this application, the bistable units are subjected to digitally coded forces and, in response thereto, react correspondingly to alter their physical configuration from one stable condition to a second stable condition. If, by a suitable linkage arrangement, the movement of a plurality of these units resulting from these changes in configuration is accumulated, the accumulated movement constitutes an analog representation of the digitally coded forces.

Hithereto, bellows have possessed only one stable state. They are constructed so that following expansion or contraction by actuating forces, they return to a neutral condition, e.g., the one stable state, at the conclusion of the actuating forces.

It is an object of the present invention to provide a bellows which may assume at least two stable conditions as, for example, fully expanded and fully contracted.

A further object is to provide a bellows, having at least two stable conditions, which is economical of design and manufacture and capable of repeated operation without failure.

Yet another object is to provide a method of making a bellows of the above type.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description, taken in connection with the accompanying drawings, in which:

FIGS. 1*a* through 3*a* disclose various embodiments of bistable bellows made in accordance with our invention, the bellows being shown in their fully expanded stable conditions; and to FIGS. 1*b* through 3*b* which depict the corresponding bistable bellows of FIGS. 1*a* through 3*a*, respectively, in their fully contracted stable conditions.

In general, a bistable bellows embodying the invention is fabricated from a plurality of flexible, metallic diaphragms which are in the general form of frusto-conically shaped members. These diaphragms are joined along their corresponding marginal portions to provide a bellows having a well-known convoluted surface configuration. The diaphragms are so designed that as the marginal portions of each diaphragm are forced axially toward each other, sufficient space is provided for each diaphragm to "snap through" and assume a different but stable configuration. If the axial loading is reversed and the marginal portions of adjacent diaphragms are forced apart, the diaphragms will snap back in toggle-like fashion to their former stable configuration.

According to one embodiment each diaphragm is constructed to flex from one stable configuration to a second, while, in a second embodiment, the flexibility of the diaphragms is varied, so that they will "snap through" at different axial forces, thereby achieving a multi-stable device. Thus, the bellows can be made to distend in discrete steps as a function of pressure (or force).

In FIGS. 1*a* and 1*b* we have shown a plurality of like diaphragms 10 concentrically arranged to form a bellows structure. The individual diaphragms are formed of metal by any of the well-known methods and they have a thickness in accordance with the desired flexibility.

As best seen in FIG. 1*a*, each diaphragm is provided with inner and outer radially extending marginal portions or rims 12 and 14, respectively. The surface of each diaphragm adjacent the rims is provided with axially extending inner and outer portions 16 and 18, respectively. A conical surface portion 20 is formed between the offset portions to complete the individual diaphragm structure. Bends 22 and 24 at the junctures between the conical portions 20 and the respective inner and outer offset portions 16 and 18 constitute annular joints or regions of concentrated flexure, the significance of which will become apparent in the discussion to follow.

In assembling the diaphragms 10 to form a bellows unit, the corresponding rims 12 and 14 of adjacent diaphragms are joined by any of the well-known methods. For example, they may be welded or crimped together as desired.

FIG. 1*b* depicts the bellows unit of FIG. 1*a* after it has been forced to assume a compressed or compacted condition. As the bellows of FIG. 1*a* is axially compressed, the conical surfaces 20 begin to distort. The reason for this is that the diaphragms are relatively inflexible in the radial direction, i.e., the rims 12 and 14 resist forces tending to chnge their radii. Consequently, as the axial distance between the flexure joints or bends 22 and 24 in each diaphragm is decreased, the spacing between the bends in each diaphragm also decreases, resulting in elastic distortion of the conical portions 20. A certain amount of flexure may take place at the junctures between the offset portions 16 and 18 and adjacent rims 12 and 14, tending to reduce the amount of distortion in the conical portions.

Initially, the compressive forces acitng on the bellows are resisted by the axial forces resulting from the resiliency of the conical surfaces and the flexure joints of each diaphragm. Maximum distortion of the conical surfaces occurs when the planes containing the joints 22 and 24 coincide since at this point the spacing between the joints is at a minimum. It will be appreciated that the axial forces resulting from distortion of the conical surfaces are zero in the vicinity of this position.

As compression continues beyond this point, the axial spacing between the bends 22 and 24 in each diaphragm begins to increase and the distortion in the conical surfaces 20 begins to decrease. Thus, the axial forces caused by the distorted condition of the conical surfaces increase, though they are now exerted in the opposite direction from before. These forces therefore supplement the externally applied compressive forces in overcoming the resiliency of the flexure joints 22 and 24. A point in the compression of the bellows unit is then reached where the axial conical surface forces tending to continue compression overcome the axial forces produced by the resiliency of the bends 22 and 24. At this point, the external compressive forces may be removed and the diaphragm will snap in toggle-like fashion, to the configuration shown in FIG. 1*b*.

The surfaces 20 then have a substantially conical configuration, but "turned inside out" with respect to the original configuration of FIG. 1*a*. Since the axial forces developed by the flexure joints 22 and 24 are insufficient to overcome the resiliency of the conical surface portions, the bellows unit will remain in this compressed condition until a sufficient external expanding force is applied to the bellows unit.

More specifically, expansion of the bellows unit from the stable configuration of FIG. 1*b* to the stable configuration of FIG. 1*a* causes the individual diaphragms 10 to operate in a similar fashion to that described above for compression of the bellows. Where the individual diaphragms are initially fabricated in the configuration of FIG. 1*a*, the bellows unit is residually biased toward the open or expanded state, since the axial forces contributed by the flexure joints 22 and 24 also urge the unit toward this state. As a result, the applied expansion forces are aided by the resilient forces of the flexure joints in overcoming the resiliency of the conical surface portions 20. Thus when the inner rims 12 and outer rims 14 approach axially aligned positions, the diaphragms 10 will "snap through" to the configuration of FIG. 1*a* as soon as the forces of the flexure joints 22 and 24 offset the resilient forces of the conical surface portions 20.

Of course if the diaphragms are initially fabricated with the bellows in the closed state (FIG. 1*b*) so that the flexure joints urge the bellows toward that state, the reverse condition will obtain. That is, the bellows will be residually biased toward the closed state. It will be appreciated that slightly less external force will be required in changing the state of the bellows in the direction of the residual bias than in the opposite direction.

It will be seen that since the portions 16 and 18 serve to axially offset the flexure joints 22 and 24 from the junctions between adjacent diaphragms, sufficient room is provided for the conical section 20 of each diaphragm 10 to flex through from one stable conical configuration to the other. The axial length of the offset portions 16 and 18 should be sufficient to permit the surfaces 20 to assume a configuration which develops sufficient axial forces to overcome the restoring forces developed at the bends or flexure joints 22 and 24 and thus remain stable. This length depends on such factors as the thickness of each of the conical sections 20 and the inner and outer diameters of these sections.

The foregoing discussion of FIGS. 1*a* and 1*b* assumes that the individual diaphragms 10 are identical. With each diaphragm having the same thickness, the resilient forces developed by each diaphragm will be essentially the same. Thus, the diaphragms will "snap through" substantially in unison. It is also contemplated that the diaphragms 10 may be fabricated with progressivley different thicknesses, whereupon each diaphragm will "snap through" with a different applied force. With this construction, the bellows may function as a multi-stable device capable of storing as well as indicating the approximate or quantized magnitude of the force previously applied to it.

Figure 2A:
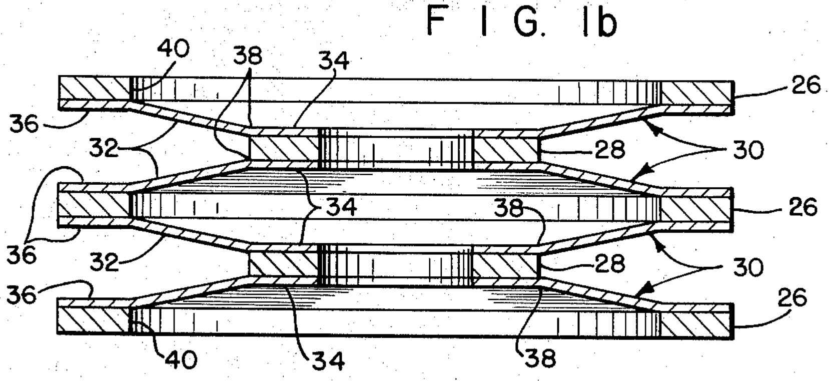
Figure 2B:
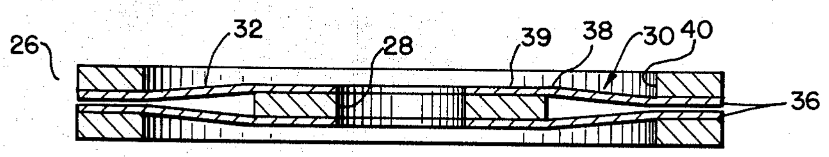

In FIGS. 2*a* and 2*b*, we have shown a second embodiment of the invention using an offset arrangement different from the portions 16 and 18 of FIGS. 1*a* and 1*b*. In this embodiment, a plurality of rings 26 are alternately arranged in axial alignment with a plurality of smaller rings 28. The inner diameter of the larger rings 26 is substantially greater than the outer diameter of the smaller rings 28. A plurality of like diaphragms 30 are provided with central conical surface portions 32 interconnecting inner and outer radially extending rims 34 and 36. As in the previously disclosed embodiment, the junctures between the conical surfaces 30 and the inner and outer rims 34 and 36 constitute annular joints 38 and 40. Corresponding rims of adjacent diaphragms are attached to the opposing surfaces of the rings 26 and 28 to complete the bellows unit.

In compressing the bellows unit of FIG. 2*a* and forcing it to assume the stable condition shown in FIG. 2*b*, the action of the flexure joints and the conical surface is essentially the same as in FIGS. 1*a* and 1*b*. Since the rings 26 and 28 are made sufficiently thick to allow the conical surface portions to "snap through" in toggle-like fashion to the stable configuration shown in FIG. 2*b*, they serve the same purpose as the offset portions 16 and 18 of FIG. 1*a*.

It is noted that in the condition shown in FIG. 2*b*, the bellows is in a "nesting" configuration somewhat different from the configuration of FIG. 1*b*. This results from a slight difference in thickness, for example, between adjacent diaphragms, and from the thicknesses of the rings 26 and 28. It will be apparent that if the rings are made sufficiently thick with respect to the longitudinal extent of the diaphragms, a configuration similar to that of FIG. 1*b* will result.

The construction of FIGS. 2*a* and 2*b* is particularly well suited for quantity production of like bellows. The rings 26 and 28, as well as the diaphragms 30, are first formed by suitable stamping machinery. The rings are then welded or brazed to the diaphragms, a step which may be largely automated.

Figure 3A:
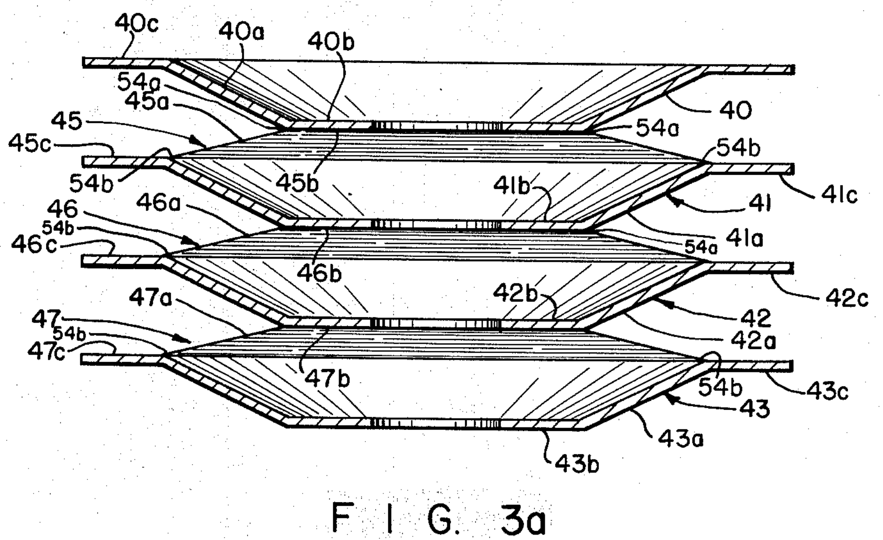
Figure 3B:
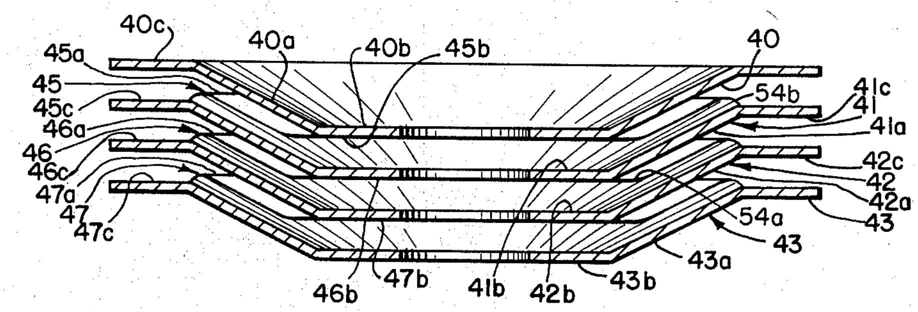

FIGS. 3*a* and 3*b* illustrate a bellows comprising a plurality of diaphragms 40–43 having a relatively large material thickness alternated with diaphragms 45–47 of significantly smaller thickness. The diaphragms 40–43 have conical surface portions **40*a*–43*a*, while the diaphragms 45–47 have conical portions 45*a*–47*a*. The diaphragms also have radially extending inner and outer marginal portions in the form of rims 40*b*–43*b*, 40*c*–43*c*, 45*b*–47*b* and 45*c*–47*c***. As in the previous embodiments, the junctures between the conical surfaces and the rims function as annular flexure joints. Corresponding rims of adjacent diaphragms are bonded together, such as by welding, to form the bellows unit.

In this embodiment, axial loading of the bellows causes the thinner diaphragms 45–47 to distort, while the thicker diaphragms 40–43 remain rigid with their conical portions 40$a$–43$a$ remaining inactive. Shortly after the inner rims 45$b$–47$b$ and their junctures with the conical portions 45$a$–47$a$ are forced through the radial planes defined by the outer flexure of adjacent rigid diaphragms 40–43, the conical portions 45$a$–47$a$ distort and "snap through" to assume the configuration shown in FIG. 3$b$. The action is essentially the same as in the previous embodiment. Since the inner rims 40$b$–43$b$ and the outer rims 40$c$–43$c$ of the rigid diaphragms are maintained axially offset during compression by the rigid conical portions 40$a$–43$a$, these diaphragms perform the function of the offset portions 16 and 18 of FIG. 1$a$ and the rings 28 of FIG. 2$a$ for the thinner diaphragms to snap through and hold, as the inner rims 45$b$–47$b$ of adjacent thin diaphragms are forced sufficiently close together to permit the forces exerted by the conical portions 45$a$–47$a$ to overcome the inner and outer resiliency of the flexure joints 54$a$ and 54$b$ respectively.

Expansion of the bellows to the open state of FIG. 3$a$ is effected in the manner described with regard to FIGS. 1$a$ and 1$b$, except that the diaphragms 40–43 operate in the identical fashion of the previously described embodiments.

Thus, the invention provides a bistable bellows which not only assumes different physical conditions under the influence of applied forces but also retains a particular physical condition once the external forces are terminated. This is accomplished by a construction which permits the individual diaphragm sections comprising the bellows to snap through in toggle-like fashion from one stable configuration to another.

It will be apparent that forces which actuate the bellows may be applied in a number of ways. For example, they may be applied through mechanical linkages to the ends of the bellows. On the other hand, these forces may result from the differences between internal and external fluid pressures acting on the bellows.

By its very nature, a bellows is well adapted for actuation by fluid pressure and therefore the invention is particularly useful in digital data processing applications making use of pneumatic or hydraulic pressure for digital representation.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A bellows having at least two stable configurations, said bellows comprising (a) a plurality of annular diaphragms, each of said diaphragms having inner and outer marginal portions, (b) means interconnecting said diaphragms in a bellows arrangement to provide for expansion and contraction of said bellows along an axis, (c) a plurality of said diaphragms being deformable along said axis, (d) each of said deformable diaphragms having (1) a generally frustoconical portion between said inner and outer marginal portions, and (2) inner and outer flexure joints between said marginal portions and said frustoconical portion thereof, (e) said frustoconical portions of said deformable diaphragms being elastically deformable to provide for relative movement along said axis of said inner and outer marginal portions thereof, (f) said interconnecting means providing for sufficient relative axial movement of said inner and outer flexure joints of each of said deformable diaphragms to permit reversal of the relative positions thereof along said axis, (g) whereby each of said deformable diaphragms has a first stable configuration in which said inner and outer flexure joints thereof have a first order in one direction along said axis and a second stable configuration in which said first and second joints have the reverse order in said direction.

2. The combination defined in claim 1 in which (a) said inner marginal portions extend axially between the frustoconical sections of adjacent diaphragms, and (b) the magnitude of axial separation between deformable frustoconical portions and frustoconical portions connected thereto at their outer marginal portions is sufficient to permit the inner flexure joints of each deformable portion and said frustoconical portion connected thereto to (1) move toward each other with at least one of said inner joints of each pair thereof so moving becoming positioned farther along said axis toward the frustoconical portion connected to the other joint in said pair than the outer flexible joint of the same frustoconical portion as said one inner joint, and (2) move away from each other with said one inner joint becoming farther along said axis away from said frustoconical portion connected to said other joint in said pair than said outer flexible joint of said same frustoconical portion as said inner joint.

3. The combination defined in claim 1 in which (a) only alternate diaphragms are deformable diaphragms with the remaining diaphragms being nondeformable, (b) each of said deformable diaphragms has (1) a first stable configuration in which the outer flexure joint thereof is farther in the axial direction toward the nondeformable diaphragm connected to said outer marginal portion thereof than said inner flexure joint, and (2) a second stable configuration in which said inner flexure joint of each of said deformable diaphragms is farther in said axial direction than said outer flexure joint, (c) said frustoconical portions of each of said deformable diaphragms undergo elastic deformation during the transition between said first and second stable states.

4. A bellows having a plurality of stable configurations, said bellows comprising (a) a plurality of diaphragms, (b) each of said diaphragms having (1) a frustoconical section, (2) inner and outer marginal portions adjoining said frustoconical section, and (3) inner and outer flexure joints between said marginal portions and said frustoconical section, (c) means interconnecting said diaphragms to form a bellows elastically deformable along a longitudinal axis, (d) said interconnecting means including (1) inner annular members disposed between adjacent inner marginal portions and adjacent to said inner flexure joints, (2) outer annular members disposed between adjacent outer marginal portions adjacent to said outer flexure joints, (e) each of said annular members spacing said flexure joints adjacent thereto sufficiently far apart in said axial direction of said bellows to provide for each diaphragm (1) a first stable state in which said outer flexible joint thereof is farther in the axial direction toward an adjacent diaphragm than the inner flexure joint thereof, and (2) a second stable state in which said inner flexure joint is farther in the axial direction toward said adjacent diaphragm than said outer flexure joint.

5. The combination defined in claim 4 in which (a) said frustoconical sections undergo elastic deformation when said diaphragms go from one stable state to the other, (b) said bellows has (1) a first stable state of minimum axial length and (2) a second stable state of maximum axial length, and (c) said diaphragms undergo a change of state in response to substantially the same force when said bellows undergoes a change of state.

6. A bellows having a plurality of stable configurations, said bellows comprising (a) a plurality of diaphragms (b) each of said diaphragms having (1) a frustoconical section, and (2) inner and outer marginal portions adjoining said frustoconical section, (c) a plurality of said diaphragms being deformable diaphragms, (d) said marginal portions of each of said deformable diaphragms adjoining said frustoconical portion thereof at inner and outer flexure joints, (e) means interconnecting said diaphragms to form a bellows elastically deformable along an axis, said interconnecting means comprising, (1) inner annular members disposed between adjacent inner marginal portions and (2) outer annular members disposed between adjacent outer marginal portions, (f) said annular members spacing said marginal portions adjacent thereto sufficiently far apart so as to provide two stable states for each deformable diaphragm.

7. A bellows adapted for quantized expansion and contraction along an axis, said bellows comprising (A) a train of bellows units coaxially connected together, (B) each of said units comprising (1) a pair of dished diaphragms joined at their peripheries, (2) at least some of said diaphragms being deformable along said axis in response to input forces acting on said bellows, (C) each said deformable diaphragm having (1) a first stable configuration in which it is dished in one direction along said axis, and (2) a second stable configuration in which it is dished in the opposite direction along said axis.

References Cited by the Examiner

UNITED STATES PATENTS

| | | | |
|---|---|---|---|
| 1,952,895 | 3/1934 | Ross | 267—1 |
| 1,962,927 | 6/1934 | De Bats | 267—1 |

RICHARD B. WILKINSON, *Primary Examiner.*